United States Patent [19]
Jee

[11] Patent Number: 5,384,796
[45] Date of Patent: Jan. 24, 1995

[54] SECOND HARMONIC GENERATING METHOD AND APPARATUS THEREOF

[75] Inventor: Seong-gil Jee, Suwon, Rep. of Korea

[73] Assignee: Samsung Electronics Co., Ltd., Kyungki, Rep. of Korea

[21] Appl. No.: 132,314

[22] Filed: Oct. 6, 1993

[30] Foreign Application Priority Data

Nov. 25, 1992 [KR] Rep. of Korea ............. 92-22329

[51] Int. Cl.$^6$ .................................. H01S 3/10
[52] U.S. Cl. ........................ 372/22; 372/105; 372/21
[58] Field of Search ............. 372/21, 22, 105, 7, 372/9

[56] References Cited

U.S. PATENT DOCUMENTS

| | | | |
|---|---|---|---|
| 3,697,888 | 10/1972 | Danielmeyer | 372/7 |
| 3,858,056 | 12/1974 | Melamed et al. | 307/88.3 |
| 4,739,507 | 4/1988 | Baer et al. | 372/22 |
| 4,764,933 | 8/1988 | Kozlovsky et al. | 372/22 |
| 5,093,832 | 3/1992 | Bethune et al. | 372/21 |
| 5,124,999 | 6/1992 | Okazaka et al. | 372/21 |

*Primary Examiner*—Léon Scott, Jr.
*Attorney, Agent, or Firm*—Leydig, Voit & Mayer

[57] ABSTRACT

A method and apparatus for second harmonic generation of laser light includes a non-linear birefringent crystalline element and a dynamic laser rod which has two transmission faces and an optical axis, the face of the dynamic laser rod facing the non-linear birefringent crystalline element being inclined at an angle to the optical axis of the dynamic laser rod so that the optical axis of the birefringent crystalline element forms a Brewster angle with a normal to the inclined face of the dynamic laser rod. Thus, the internal space occupied by the second harmonic generating apparatus is reduced and the supporting structure is miniaturized.

6 Claims, 2 Drawing Sheets

SECOND HARMONIC GENERATING METHOD AND APPARATUS THEREOF

FIELD OF THE INVENTION

The present invention relates to a method and apparatus for generating second harmonics from a non-linear bifringent crystalline material of a resonator.

BACKGROUND OF THE INVENTION

Second harmonic generation (SHG) has been developed largely as an important technique which causes visible light radiation using a solid laser. A pair of mirrors which generates a resonating beam is installed in a laser cavity in order to increase the optical effectiveness of a second harmonic generation. Second harmonic generation is a second-order non-linear optical technique and its effectiveness is in proportion to the square of the output of a pumping laser. The development of a laser diode matched to the absorption band of a solid laser material such as Nd:YAG enables the minimization of a solid laser. However, a diode-pump solid laser still does not have an enough output to produce an effective second harmonic generation.

U.S. Pat. Nos. 3,858,056 and 5,093,832 each proposed a technique for achieving an effective second harmonic generation with a relatively low output, through an intra-cavity method in which an intra laser resonator is provided.

The techniques disclosed in the above patents maximize the Q value of a laser resonator, that is, the ratio (Q=Dp/Dd) of a parallel light density (Dp) to a diffusion light density (Dd), is maximized, by which the SHG output of an accumulated resonating beam in a resonator is increased. Therefore, this SHG effectiveness of an intra-cavity depends on how much the loss of the intra-resonator can be minimized. The basic element of a small intra-cavity SHG laser which has thus far been proposed, including the above two patents, comprises two high-reflection mirrors which provide a high Q cavity, a gain medium (e.g., YAG) which is arranged between the above two mirrors, a non-linear bifringent crystalline element (e.g., KTP), a Brewster plate, etc.

Referring to U.S. Pat. No. 3,858,056, as shown in FIG. 2, harmonics 22 output from a laser cavity 10 in which mirrors 12 and 13, a dynamic laser rod, e.g., YAG 19, and a non-linear bifringent crystalline element, e.g., KTP 18 are prepared, is partially split using a beam splitter 21, and then the split part of harmonics passes through a filter 24. Then, beam strength thereof is measured using a photo-detector 23, applying an alternate time-sequential method. Then, the temperature of a non-linear bifringent crystalline element is controlled by a difference between the strength values sequentially obtained from a multivibrator 27 and a bidirectional counter 28. However, the overall system structure for this method of SHG is complicated, and controlling the temperature of a non-linear bifringent crystalline element using only a beam strength error signal is difficult, which causes problems in putting this method to practical use.

U.S. Pat. No. 5,093,832 describes a resonating beam and discloses more particulary a feedback method of SHG by measuring a beam angle. As shown in FIG. 1, this patent describes a structure in which an optical resonator 10 having mirrors 12 and 13 at both ends and an optical path of a reflection beam reflected from mirror 13 is different from a processing path of an incident beam emitted from a laser diode 9. Part of the output beam is isolated through a beam splitter 54, and then is photo-detected by a photo-detector 23 to be fed-back to a peltier element 80 using a temperature controller 33. However, in this technique, a feedback circuit includes photo-detector 23, a differential amplifier 66, a temperature controller 33, and a thermistor 86, which are separately installed outside an optical resonator 10. Particulary, it is difficult to minimize an SHG module because a number of independant elements are arranged inside an optical resonator.

SUMMARY OF THE INVENTION

It is an object of the present invention to provide a second harmonic generating method and apparatus thereof, which can be miniatured while increasing its effectiveness.

A second harmonic generating method of the present invention tHxaccomplish the above object locates one side of a dynamic laser rod which faces a non-linear bifringent crystalline material so as to have an angle $\theta_p$ with respect to an optical axis that satisfies the following expression:

$$\theta_p = \sin^{-1}\left[\frac{1}{\eta_{laser}} \sin\theta_B\right]$$

wherein $\theta_B$ represents a brewster angle and $\eta_{laser}$ represents a refractive index of a dynamic laser rod.

The above optical axis of a non-linear bifringent crystalline element is located to have a brewster angle with a normal direction of the inclined side of the above dynamic laser rod, and both faces of the above non-linear bifringent crystalline element are arranged at right angles with the optical axis.

It is a characteristic of the present invention to have an anti-reflective coating layer against a laser wave of the above basic frequency formed in one side of the above non-linear bifringent crystalline element which faces the above dynamic laser rod, while a high reflective coating layer which has a high reflection against the laser wave of a basic frequency and a high transmissive coating layer which has a high transmission for a second harmonics are formed in the opposite side.

To accomplish the above object, it is a characteristic of a second harmonic generator of the present invention to comprise a non-linear bifringent crystalline element and a dynamic laser rod which respectively has two transmission faces against an optical axis.

One side of the above dynamic laser rod which faces the above non-linear bifringent crystalline element is formed to have a predetermined angle of inclination with respect to the optical axis of a dynamic laser rod.

The above non-linear bifringent crystalline element is located so as to form a brewster angle by an optical axis of the non-linear bifringent crystalline element with a normal direction of the inclined side of the above dynamic laser rod.

In the present invention, it is desirable to have an angle ($\theta_p$) of the above inclined side with an optical axis of a dynamic laser rod, satisfying the following expression:

$$\theta_p = \sin^{-1}\left[\frac{1}{\eta_{laser}} \sin\theta_B\right]$$

wherein $\theta_B$ represents a brewster angle and $\eta_{laser}$ represents a refractive index of a dynamic laser rod.

In addition to this structure, both faces of the above non-linear bifringent crystalline element are arranged at right angle with the optical axis.

Formed on one side of a dynamic laser rod in which a pumping laser is input, are a high-reflective coating layer which has a high reflection against a laser wave of the basic frequency generated within the dynamic laser rod, and a high transmissive coating layer which has a second harmonics generated from a non-linear bifringent crystalline element are formed.

Additionally, it is desirable to have an anti-reflective coating layer against a laser wave of the above basic frequency formed in one side of the above non-linear bifringent crystalline element which faces the above dynamic laser rod, and a high reflective coating layer which has a high reflection against the basic frequency laser wave and a high transmissive coating layer which has a high transmission for a second harmonic are formed in the opposite side.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The embodiments of the present invention will be described below with reference to the accompanying drawings, in more detail.

For a basic second harmonics generating method of the present invention, a pumping source like a laser diode, a dynamic laser rod which generates a laser beam of the basic frequency from a pumping source, and a non-linear bifringent crystalline element which generates a harmonic from a laser of the basic frequency are needed. In addition to this, a mirror is needed on each side of the above factors in order to prepare a laser resonating area.

At the status in which all these basic factors are prepared, one side of a dynamic laser rod which faces a non-linearHxifringent crystalline element should be located so as to have an angle $\theta p$ with an optical axis, satisfying the following expression:

$$\theta_p = \sin^{-1}\left[\frac{1}{\eta_{laser}} \sin\theta_B\right] \quad (1)$$

wherein $\theta_B$ represents a brewster angle and $\eta_{laser}$ represents a refractive index of a dynamic laser rod.

The above optical axis of a non-linear bifringent crystalline element is located to have a brewster angle with a normal direction of the inclined side of the above dynamic laser rod. Also, both sides of the above non-linear bifringent crystalline element are arranged at right angles with an optical axis, An anti-reflective coating layer against a laser wave of the above basic frequency is formed in one side of the above non-linear bifringent crystalline element which faces the above dynamic laser rod, while a high-reflective coating layer which has a high reflection against the laser wave of a basic frequency and a high-transmissive coating layer which has a high transmission for a second harmonic are formed in the opposite side.

Figure 1:
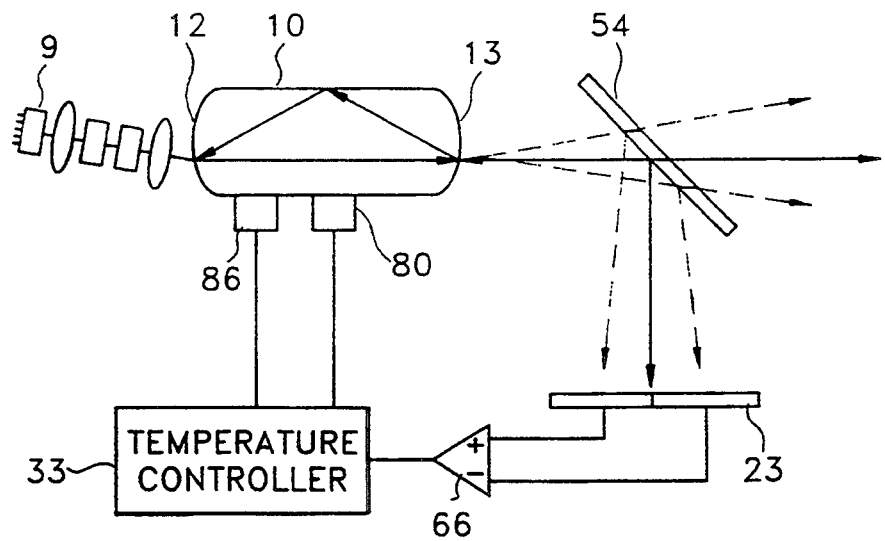
FIG. 1 is a structure diagram showing a conventional second harmonic generator.
Figure 2:
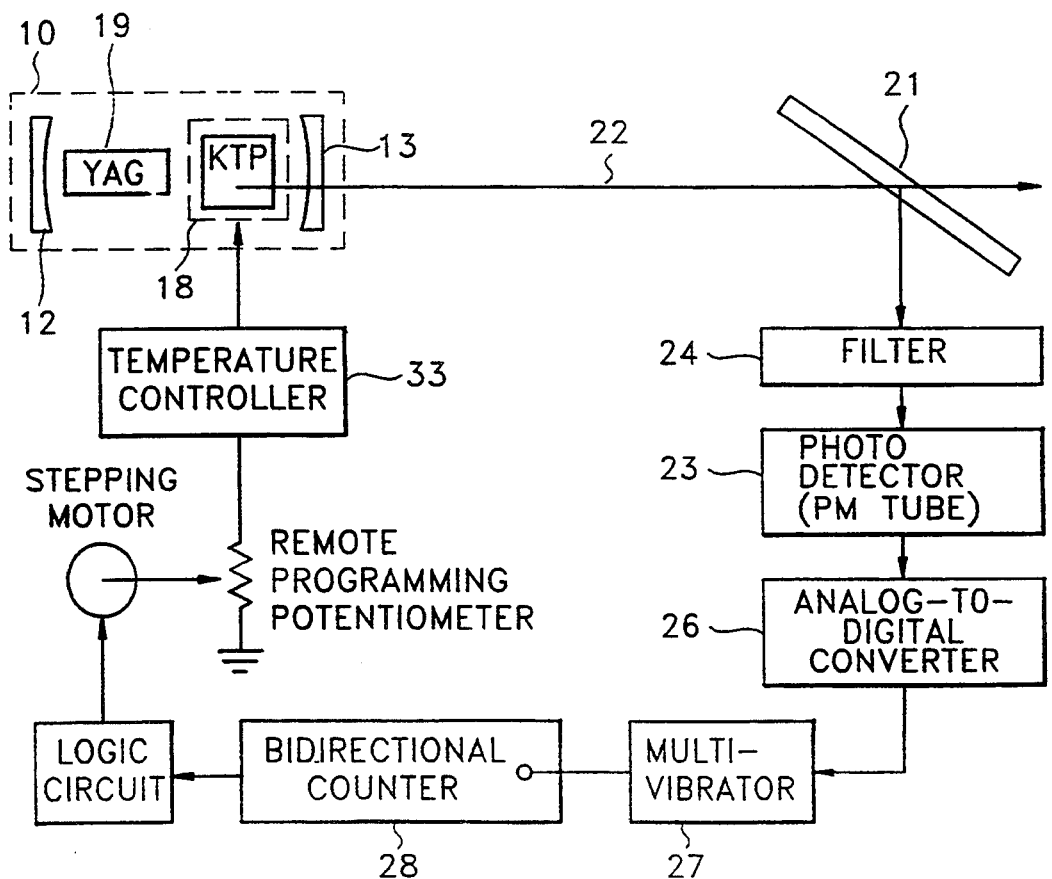
FIG. 2 is a structure diagram showing another conventional second harmonic generator.
Figure 3:
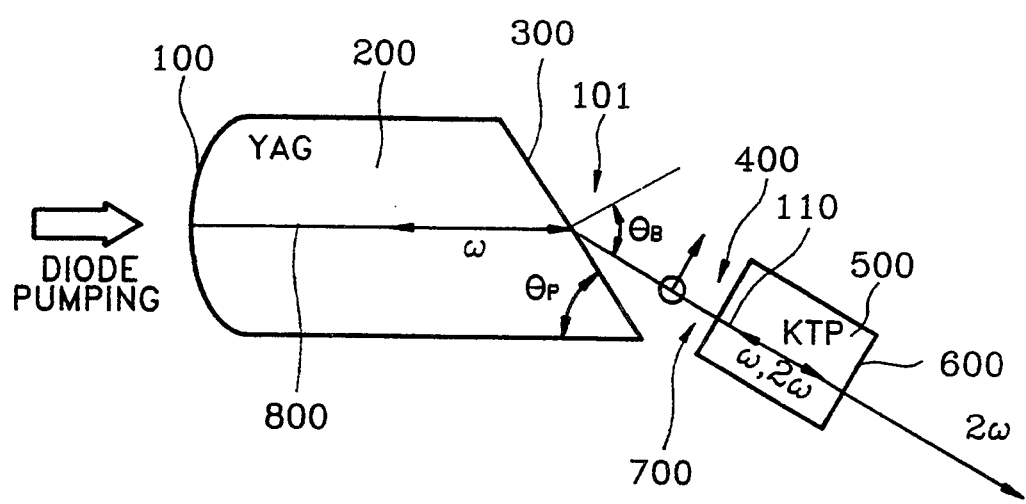
FIG. 3 is a structure diagram showing an embodiment of a second harmonic generator according to the present invention.

With these prerequisites satisfied, an object harmonics can be obtained by implanting a pumping light into a dynamic laser rod, and a device of the present invention where this method is performed is shown in FIG. 3.

FIG. 3 is a schematic representation of a second harmonic generation according to the present invention. Referring to this, a laser source which provides a pumping laser source, and as laser basic wave generators, inputting mirrors 100 at two sides and a dynamic laser rod YAG 200 in which a brewster side 300 is prepared, and a non-linear bifringent crystalline element KTP 500 which generates a second harmonic from a basic wave $\omega$ of the dynamic laser rod 200 where an output mirror 600 is prepared in the side of it, are sequentially arranged.

A dynamic laser rod 200 is located on the proceeding axis of a pumping laser which is generated from a pumping laser source, while a KTP 500 is located on the optical axis which is inclined toward the proceeding axis by a predetermined angle.

An input mirror 100 and an output mirror 600 are obtained by coating of a reflective material, and should have a high reflection against the basic wave $\omega$. An input mirror 100 should have an optical high transmission against a light of the predetermined wave because it has to transmit a pumping laser source of a predetermined wave. Accordingly, an input mirror 100 should be manufactured to have both a high transmission and a reflection against a certain wave.

On the other hand, an anti-reflective coating, i.e., an anti-reflection layer 400 should be prepared in one side of the KTP 500 which faces toward a brewster side 300, in order to reduce a loss in the fundamental frequency $\omega$.

In addition, an output mirror 600 of the KTP 500 should have a high reflection against the basic wave and a high transmission against a harmonics.

Differently from a conventional second harmonics generation, a second harmonics generation of the present invention is characterized by not having an additional mirror and brewster plate, because in the present invention, an additional brewster plate function of the prior art is given to a brewster side of the YAG. That is, when YAG 200 and KTP 500 are properly aligned, and when an angle $\theta_b$ between an optical axis 110 and a normal direction 101 of brewster side 300 is decided as a brewster angle, and when the polarization marked as 700 is achieved without any loss, most of the light is transmitted through the brewster side. To accomplish this, an inclination angle $\theta_p$ has to satisfy the above expression (1).

In the structure of the present invention shown in FIG. 3, an optical axis 800 is in accordance with that of a mirror 100. Therefore, in the course of making a dynamic laser rod, an angle $\theta_p$ of the brewster side 300 should be the same as that mirror 100 has when it goes to vertically to the bottom. To achieve this structure, a precise processing is required. The processing of a non-linear bifringent crystalline element 500 is also very important. Since an output mirror 600 is used as one side of a resonator, a laser cavity alignment and a phase matching angle tuning by the control of a non-linear bifringent crystalline element 500 should be satisfied simultaneously. Therefore, the front and back of the reflection side 400 of a non-linear bifringent crystalline element 500 and an output mirror 600 should be parallel with each other, and should be vertical to an optical axis 110. The phases of the non-linear bifringent crystalline element 500 and the optical axis 110 of the laser which goes through the non-linear bifringent crystalline element, should be in maximum accordance with each other.

In the above structure, an experiment shows that a second harmonic generation of which size is below 10 mm can be realized using 5 mm of a dynamic laser rod and 5 mm of a non-linear bifringent crystalline element.

A second harmonic generation of the present invention is characterized by having a largely reduced structural part and having an integrated structure in which only two elements, i.e., a dynamic laser rod and a non-linear bifringent crystalline element appear, and two input/output mirrors needed for the second harmonics generation are prepared in the optical transmission faces of a dynamic laser rod and a non-linear bifringent crystalline element. This kind of structure enables the structure of the total system to be simplified and miniaturized, to thereby reduce the internal space occupied by the apparatus and miniaturize the supporting structure.

What is claimed is:

1. A second harmonic generating method comprising: arranging a dynamic laser rod having an optical axis with an inclined face forming an angle $\theta_P$, with respect to the optical axis of the dynamic laser rod so that $$\theta_p = \sin^{-1}\left[\frac{1}{\eta_{laser}} \sin\theta_B\right]$$

wherein $\theta_B$ is the Brewster angle and $\eta_{laser}$ is the refractive index of the dynamic laser rod and an opposite face through which laser pumping light is received; and arranging an optical axis of a non-linear birefringent crystalline element to form the Brewster angle with a normal to the inclined face of the dynamic laser rod whereby light from the dynamic laser rod incident on the non-linear birefringent crystalline element is polarized perpendicular to the optical axis of the non-linear birefringent crystalline element, the non-linear birefringent crystalline element having two opposed faces perpendicular to the optical axis of the non-linear birefringent crystalline element, an anti-reflective coating layer for a basic frequency of laser light generated in the dynamic laser rod on the face of the non-linear birefringent crystalline element facing the dynamic laser rod and a reflective coating highly reflecting the basic frequency laser light and a coating layer that is highly transmissive of a second harmonic of the basic frequency laser light on the face of the dynamic laser rod opposite the inclined face.

2. A second harmonic generating apparatus comprising a non-linear birefringent crystalline element and a dynamic laser rod which has two transmission faces and an optical axis wherein the transmission face of the dynamic laser rod that faces the non-linear birefringent crystalline element is inclined at a predetermined angle with respect to the optical axis of the dynamic laser rod and the birefringent crystalline element has an optical axis forming a Brewster angle with a normal to the inclined transmission face of the dynamic laser rod whereby light from the dynamic laser rod incident on the non-linear birefringent crystalline element is polarized perpendicular to the optical axis of the non-linear birefringent crystal-line element.

3. The second harmonic generating apparatus according to claim 2 wherein an angle $\theta_P$ of the inclined transmission face of the dynamic laser rod relative to the optical axis of the dynamic laser rod satisfies the expression:

$$\theta_p = \sin^{-1}\left[\frac{1}{\eta_{laser}} \sin\theta_B\right]$$

wherein $\theta_B$ is the Brewster angle and $\eta_{laser}$ is the refractive index of the dynamic laser rod.

4. The second harmonic generating apparatus according to claim 2 wherein the non-linear birefringent crystalline element has two faces that are perpendicular to the optical axis of the birefringent crystal-line element.

5. The second harmonic generating apparatus according to claim 2 including a highly reflective coating highly reflecting basic frequency laser light generated in the dynamic laser rod and a transmissive coating that highly transmits a second harmonic if the basic frequency laser light generated by the non-linear birefringent crystalline element on the transmission face of the dynamic laser rod, opposite the inclined transmission face, where pumping laser light is input.

6. The second harmonic generating apparatus according to claim 2 including an anti-reflective coating for the basic frequency laser light in the face of the non-linear birefringent crystal-line element that faces the dynamic laser rod and a highly transmissive coating highly transmitting a second harmonic of the basic frequency laser light on the face of the non-linear birefringent crystalline element remote from the dynamic laser rod.

* * * * *